United States Patent
Joergensen et al.

(10) Patent No.: US 12,373,960 B2
(45) Date of Patent: Jul. 29, 2025

(54) DYNAMIC OBJECT DETECTION USING LIDAR DATA FOR AUTONOMOUS MACHINE SYSTEMS AND APPLICATIONS

(71) Applicant: NVIDIA Corporation, Santa Clara, CA (US)

(72) Inventors: Jens Christian Bo Joergensen, Flushing, NY (US); Ollin Boer Bohan, Redmond, WA (US); Joachim Pehserl, Lynnwood, WA (US); Nikolai Smolyanskiy, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 501 days.

(21) Appl. No.: 17/672,402

(22) Filed: Feb. 15, 2022

(65) Prior Publication Data

US 2023/0260136 A1 Aug. 17, 2023

(51) Int. Cl.
*G06T 7/254* (2017.01)
*G06V 10/44* (2022.01)

(52) U.S. Cl.
CPC ............ *G06T 7/254* (2017.01); *G06V 10/454* (2022.01); *G06T 2207/10028* (2013.01); *G06T 2207/20084* (2013.01); *G06V 2201/07* (2022.01)

(58) Field of Classification Search
CPC .......... G06T 7/254; G06T 2207/10028; G06T 2207/20084; G06V 10/454
See application file for complete search history.

(56) References Cited

U.S. PATENT DOCUMENTS 10,885,698 B2   1/2021  Muthler et al.
11,062,454 B1 *  7/2021  Cohen .................... G01S 7/417
(Continued)

FOREIGN PATENT DOCUMENTS

EP   2525000 A1   8/2019
EP   3832532 A2   6/2021
WO   2023158556 A1   8/2023

OTHER PUBLICATIONS

Behl, A., Paschalidou, D., Donné, S., & Geiger, A. (2018). PointFlowNet: Learning Representations for Rigid Motion Estimation From Point Clouds. 2019 IEEE/CVF Conference on Computer Vision and Pattern Recognition (CVPR), 7954-7963. (Year: 2018).*

(Continued)

*Primary Examiner* — Vu Le
*Assistant Examiner* — Jack Peter Kraynak
(74) *Attorney, Agent, or Firm* — Taylor Duma L.L.P.

(57) ABSTRACT

In various examples, systems and methods of the present disclosure detect and/or track objects in an environment using projection images generated from LiDAR. For example, a machine learning model—such as a deep neural network (DNN)—may be used to compute a motion mask indicative of motion corresponding to points representing objects in an environment. Various input channels may be provided as input to the machine learning model to compute a motion mask. One or more comparison images may be generated based on comparing depth values projected from a current range image to a coordinate space of a previous range image to depth values of the previous range image. The machine learning model may use the one or more projection images, the one or more comparison images, and/or the one or more range images to compute a motion mask and/or a motion vector output representation.

20 Claims, 10 Drawing Sheets

(56) References Cited

U.S. PATENT DOCUMENTS

| | | | | |
|---|---|---|---|---|
| 11,741,631 | B2* | 8/2023 | Serackis | G06T 7/251 382/100 |
| 2018/0322640 | A1* | 11/2018 | Kim | G06T 5/70 |
| 2018/0364717 | A1* | 12/2018 | Douillard | G01S 17/931 |
| 2019/0332939 | A1* | 10/2019 | Alletto | G06N 3/08 |
| 2020/0081448 | A1* | 3/2020 | Creusot | G06V 20/584 |
| 2020/0084427 | A1* | 3/2020 | Sun | G06N 3/045 |
| 2020/0226769 | A1* | 7/2020 | Das | G06T 7/254 |
| 2020/0258249 | A1* | 8/2020 | Angelova | G06T 7/285 |
| 2020/0377105 | A1* | 12/2020 | Murashkin | B60W 40/04 |
| 2021/0150230 | A1* | 5/2021 | Smolyanskiy | G06V 10/82 |
| 2021/0150736 | A1* | 5/2021 | Lv | G06T 7/11 |
| 2021/0319578 | A1* | 10/2021 | Casser | G06N 3/088 |
| 2021/0342608 | A1* | 11/2021 | Smolyanskiy | G06V 10/454 |
| 2021/0358137 | A1* | 11/2021 | Lee | G06N 3/045 |
| 2021/0383553 | A1* | 12/2021 | Guizilini | G06T 7/20 |
| 2022/0284221 | A1* | 9/2022 | Slutsky | G06T 7/50 |

OTHER PUBLICATIONS

S. A. Baur, F. Moosmann, S. Wirges and C. B. Rist, "Real-time 3D LiDAR Flow for Autonomous Vehicles," 2019 IEEE Intelligent Vehicles Symposium (IV), Paris, France, 2019, pp. 1288-1295, doi: 10.1109/IVS.2019.8814094. (Year: 2019).*

X. Qi, Z. Liu, Q. Chen and J. Jia, "3D Motion Decomposition for RGBD Future Dynamic Scene Synthesis," 2019 IEEE/CVF Conference on Computer Vision and Pattern Recognition (CVPR), Long Beach, CA, USA, 2019, pp. 7665-7674, doi: 10.1109/CVPR.2019.00786 (Year: 2019).*

Joegensen, et al.; International Search Report and Written Opinion for International Application No. PCT/US2023/012097, filed Feb. 1, 2023, mailed Apr. 25, 2023, 13 pgs.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Joergensen, Jens Christian Bo; International Preliminary Report on Patentability for PCT Application No. PCT/US2023/012097, filed Feb. 1, 2023, mailed Aug. 29, 2024, 10 pgs.

* cited by examiner

DYNAMIC OBJECT DETECTION USING LIDAR DATA FOR AUTONOMOUS MACHINE SYSTEMS AND APPLICATIONS

BACKGROUND

The ability to safely detect static and dynamic features and objects in an environment is an important task for any autonomous or semi-autonomous system—such as an autonomous or semi-autonomous driving system. For example, by observing movement—or the lack thereof—across frames, static features or dynamic actors may be identified to aid in various downstream tasks, such as object tracking, path planning, obstacle avoidance, control decisions, and/or the like.

Some conventional approaches use an object detector that may execute on one or more frames of data to match objects or features across frames, and then to infer motion from the matched features or objects. However, such conventional approaches are limited by the object detectors ability to identify objects, which requires prior knowledge of each object or feature type to be detected. For example, these systems often require extensive training using large amounts of training data including depictions of the particular objects the detector is trained to detect. However, given that there may be nearly unlimited types of objects, these conventional approaches are often inadequate and/or incomplete solutions for detecting and tracking objects.

Other systems may employ optical flow approaches to find a pixel-level flow field from one frame to a subsequent frame based on analyzing a time series of frames. These conventional approaches require that each frame—e.g., each LiDAR range image—includes adequate texture information to allow for accurate tracking across frames. However, generating data—especially LiDAR data—with adequate texture information is challenging due to LiDAR sensor viewpoint changes and/or potential scene occlusion. While some conventional systems may combine the above approaches, these combinations do not overcome many of the shortcomings of these conventional solutions.

SUMMARY

Embodiments of the present disclosure relate to detecting static and dynamic features from LiDAR in autonomous machine applications. Systems and methods are disclosed that determine motion based on one or more range images and one or more projection images.

In contrast to conventional systems, such as those described above, systems and methods of the present disclosure detect and/or track objects (e.g., static and/or moving objects) in an environment using projection images—e.g., LiDAR range images, top-down or birds eye view projection images, etc.—of points clouds and/or other detection representations. For example, a machine learning model—such as a deep neural network (DNN)—may be used to compute a motion mask or other output type indicative of motion corresponding to points or pixels representing objects or features in an environment. Various input channels may be provided as input to the machine learning model to aid the machine learning model in computing the output. For example, one or more projection images may be generated based on projecting depth values from a current range image to a coordinate space of a previous range image and/or projecting depth values from a previous range image to a coordinate space of a current range image. In some embodiments, one or more comparison images may be generated based on comparing depth values projected from a current range image to a coordinate space of a previous range image to depth values of the previous range image. Where a projection from one coordinate space to another is executed, the projection may be based on tracked ego-motion—e.g., recorded motion of an ego-machine between a time associated with the previous frame and a time associated with a current frame. In addition, a current and/or prior range image may be provided directly as input to the machine learning model. As such, the machine learning model may use the one or more projection images, the one or more comparison images, and/or the one or more range images (or other input representations, such as a top-down view projected image) to compute a motion mask and/or a motion vector output representation.

Due to the organization and quality of information in the input channels for the machine learning model, the machine learning model may be lightweight. For example, where the machine learning model is a convolutional neural network (CNN), the CNN may require only very local convolutional support—e.g., may only require ten or less layers (e.g., six total layers, in some embodiments). In addition, the CNN may include only convolutional layers and no, e.g., fully connected layers or other layer types that may require more compute. To provide additional support for frames where occlusion, shading, and/or noise may weaken the input signals, the input channels may be computed between more than two frames—e.g., between two or more prior frames and a current frame. As such, by including additional input channels corresponding to multiple prior frames, additional data may be available for the machine learning model in processing accurate or precise outputs that account for noise, occlusion, and/or shading.

BRIEF DESCRIPTION OF THE DRAWINGS

The present systems and methods for detecting static and dynamic features from LiDAR in autonomous machine applications are described in detail below with reference to the attached drawing figures, wherein.

DETAILED DESCRIPTION

Figure 1:
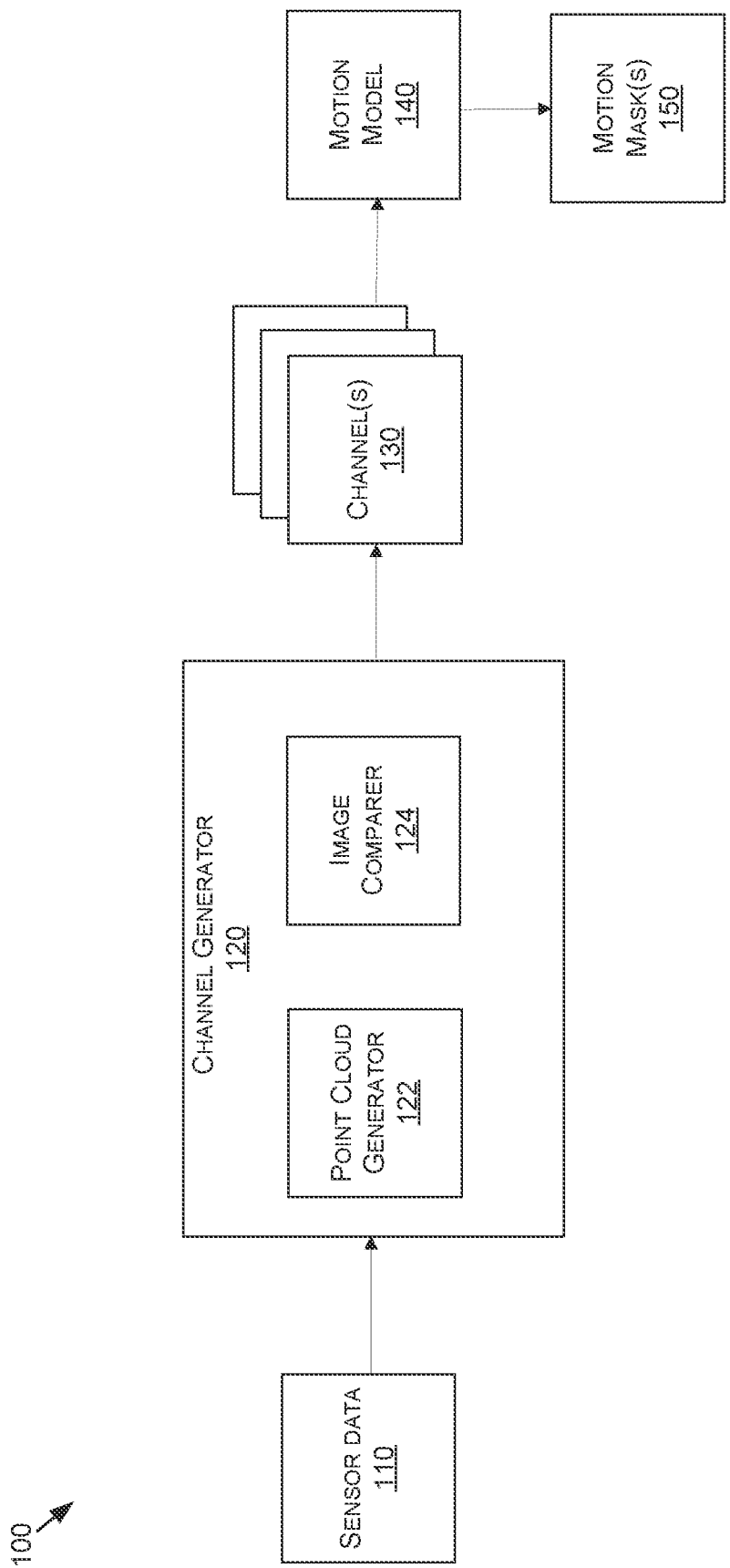
FIG. 1 is a data flow diagram for a static and dynamic features detection system, in accordance with some embodiments of the present disclosure.

Systems and methods are disclosed related to detecting static and dynamic features from LiDAR in autonomous machine applications. Although the present disclosure may be described with respect to an example autonomous vehicle 500 (alternatively referred to herein as "vehicle 500" or "ego-vehicle 500," an example of which is described with respect to FIGS. 5A-5D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to feature and/or object tracking in autonomous machine applications, this is not intended to be limiting, and the systems and methods described herein may be used in augmented reality, virtual reality, mixed reality, robotics, security and surveillance, autonomous or semi-autonomous machine applications, and/or any other technology spaces where feature and/or object tracking may be used.

In some embodiments, as an ego-machine travels through an environment, one or more sensor(s) (e.g., LiDAR sensors, RADAR sensors, etc.) of the ego-machine may generate a series of frames or sensor data, which may be converted to one or more representations. For example, where LiDAR sensors are used, raw LiDAR data may be generated at each frame or time step, and the raw LiDAR data may be used to generate a point cloud in 3D world-space representing depth, elevation, and lateral locations of points corresponding to features and/or objects in the environment. Using the point cloud, for example, one or more 2D image representations may be generated—such as a LiDAR range image, a top-down or birds eye view image, etc.—that represent the elevation and lateral location of points at one or more (x, y) pixel locations, with one or more depth values (and/or other values, such as intensity, reflectivity, etc.) encoded to the pixels. The depth value(s) may correspond to a distance from the sensor(s) to the 3D point in the environment represented by the range image.

The range images for a current frame and one or more prior frames may be used directly as input channels to a machine learning model—e.g., a deep neural network (DNN)—or may be used to generate one or more input channels for the machine learning model. For example, in some embodiments, depth values corresponding to a current range image may be converted or projected to a coordinate system of a prior range image to generate a projected image. For example, a transformation may be applied to the 3D points corresponding to the depth value(s) in the current range image to locate these 3D points within the pixel index of the previous range image(s) using a coordinate system of the previous range image(s). As another example, one or more depth values corresponding to a prior range image may be converted to a coordinate space of a current range image to generate a projected image.

In some embodiments, an input channel may be generated by projecting a current range image to a coordinate system of a prior image, comparing the projected depth value(s) to the depth value(s) of the prior image, and then generating a comparison image encoding the changes in depth values between frames. Where depth values are converted or projected to another coordinate space corresponding to a different frame, the conversion or projection may be executed using ego-motion information—e.g., rotation, position, and/or velocity data captured by an IMU, GPS, and/or visual odometry system of the ego-machine. As such, once in a same coordinate system, where depth values differ for a particular pixel (e.g., by more than a threshold depth difference), this may indicate that the point or pixel corresponds to a moving or dynamic object. In some embodiments, the depth values and location (e.g., order) of 3D points of the current range image may be preserved for use in subsequent computations where the current range image may be used as a previous range image with a corresponding coordinate system. In addition to or alternatively from a projected or a comparison image(s), the prior range image and/or the current range image may be provided as input channels directly to the machine learning model without projecting to a different coordinate space.

A number of input channels may depend on the number of previous frames corresponding to previous time stamps are provided to the machine learning model. For example, the number of channels provided in an input image to the machine learning model may be calculated according to equation (1), below:

$$\text{NUM\_CHANNELS}=3*\text{NUM\_FRAMES}+1 \qquad (1)$$

where NUM_FRAMES is the number of previous frames at previous time stamps. For each prior frame, the three input channels may include a current frame projected to the prior frame, the prior frame projected to the current frame, and a comparison image comparing current frame values projected to the prior frame to prior frame values. Although described as including all three channels for each frame, this is not intended to be limiting, and in some embodiments one or more of the channels may be used for each prior frame.

With respect to a single 3D point in an environment, the channels may represent, for that 3D point, a first channel associated with a distance between a location of the ego-machine at $T_0$ and the 3D point of interest. This first channel may correspond to directly applying the range image corresponding to a current time as an input channel, and may correspond to the "+1" in equation (1) above. A second channel may be associated with a distance between a location of the ego-machine at $T_0$ and a first 3D point at $T_{-1}$ that projects to the same pixel as the 3D point of interest when viewed from the location of the ego-machine at $T_0$. A third channel may be associated with a distance between a location of the ego-machine at $T_{-1}$ and the 3D point of interest. A fourth channel may be associated with a distance between a location of the ego-machine at $T_{-1}$ and a second 3D point at $T_{-1}$ that projects to the same pixel as the 3D point of interest when viewed from the location of the ego-machine at $T_{-1}$.

In some embodiments, the channels may be provided as one or more input images (e.g., a channel stack) to the machine learning model, and the machine learning model may process the channel stack to generate a motion mask with motion confidence values (e.g., from 0 to 1) assigned to one or more (e.g., each) of the pixels indicating a confidence that the pixel is associated with a static or dynamic object or feature—e.g., a pixel with a value of 0.3 may be less likely to have motion associated therewith than a pixel with a value of 0.9. In some embodiments, using the motion mask output from the machine learning model, the system may identify point clusters corresponding to objects and track those objects across frames. In further embodiments, the motion mask may be used to identify regions of interest and may be provided as an input to a separate object detector, which may increase the detection rate of the separate object detector. Moreover, by tracking pixel motion between frames, the system may further determine vectors corresponding to 3D points in addition to motion confidence values. In some embodiments, the machine learning model may be trained to compute an output of motion vectors in addition to or alternatively from confidence values. For example, for a given pixel in a current frame, the output may include a motion vector pointing to the same pixel (e.g., a pixel corresponding to the same feature or object) in a prior frame.

Where the machine learning model is a DNN, such as a convolution neural network (CNN), the DNN may include a lightweight architecture, such as a fully convolutional architecture consisting of only convolutional layers. In some embodiments, there may be ten or less (e.g., six) layers in total for the DNN. The limited number of layers and the overall lightweight architecture may be possible due to the amount of information and detail available in the input channels in accordance with embodiments of the present disclosure.

As such, if the system determines that a depth value corresponding to a 3D point has changed over time, the system may infer that movement has occurred at that particular 3D point. As a non-limiting example, if a distance from the ego-machine to a point on a wall is 10 meters in a previous range image at time $T_{-1}$, and the distance from the ego-machine to the point on the wall is 5 meters in a current range image at time $T_0$, then the system may determine that an object has moved into the line-of-sight of the sensor(s) of the ego-machine.

With reference to FIG. 1, FIG. 1 is an example data flow diagram for a system 100 for detecting static and dynamic features from sensor data in autonomous machine applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by any (or a combination) of hardware, firmware, and/or software. For instance, various functions may be carried out by a processor executing instructions stored in memory. In some embodiments, the system 100 may be implemented using similar components, features, and/or functionality as that of example autonomous vehicle 500 of FIGS. 5A-5D, example computing device 600 of FIG. 6, and/or example data center 700 of FIG. 7.

The data flow of FIG. 1 includes sensor data 110, channel generator 120, point cloud generator 122, image comparer 124, channel(s) 130, motion model 140, and motion mask 150. In some embodiments, the sensor data 110 may include, without limitation, sensor data 110 from any of the sensors of the vehicle 500 (and/or other vehicles, machines, or objects, such as robotic devices, water vessels, aircraft, trains, construction equipment, VR systems, AR systems, etc., in some examples). For a non-limiting example, such as where the sensor(s) generating the sensor data 110 are disposed on or otherwise associated with a vehicle, the sensor data 110 may include the data generated by, without limitation, global navigation satellite systems (GNSS) sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), and/or other sensor types.

In some embodiments, as the vehicle 500 travels through an environment, one or more sensor(s) (e.g., LiDAR sensors, RADAR sensors, etc.) of the vehicle 500 may generate the sensor data 110. The sensor data 110 may be passed to the channel generator 120 and converted to one or more representations. For example, sensor data 110—such as raw LiDAR data—may be generated at each frame or time step as the vehicle 500 travels through the environment. The point cloud generator 122 may then use the sensor data 110 from each frame or time step to generate a point cloud in 3D world-space representing depth, elevation, and lateral locations of points corresponding to features and/or objects in the environment. Using the generated point cloud, for example, the channel generator 120 may generate one or more 2D image representations—such as a LiDAR range image—that may represent the elevation and lateral location of points at (x, y) pixel locations, with depth values (and/or other values, such as intensity, reflectivity, etc.) encoded to the pixels. The depth values of the image representation may correspond to a distance from the sensor(s) of the vehicle 500 to the 3D point in the environment represented by the range image.

In some embodiments, the range images corresponding to a current frame (or time) and one or more prior frames (or times) may be output as channel(s) 130. These channel(s) 130 may be provided to the motion model 140 e.g., a deep neural network (DNN). Additionally or alternatively, the range images may be manipulated by the channel generator 120 to generate the channel(s) 130 for the motion model 140. For example, in some embodiments, the channel generator 120 may convert or project one or more depth values corresponding to a current range image to a coordinate system of a prior range image to generate a projected image. For example, the channel generator 120 may apply a transformation to the 3D points corresponding to the one or more depth values in the current range image to locate these 3D points within the pixel index of the previous range image(s) using a coordinate system of the previous range image(s). In further embodiments, the channel generator 120 may convert depth values corresponding to a prior range image to a coordinate space of a current range image to generate a projected image.

In some embodiments, the image comparer 124 may generate the channel(s) 130 by projecting a current range image to a coordinate system of a prior image, comparing the projected depth values to the depth values of the prior image, and then generating a comparison image encoding the changes in depth values between frames. Where depth values are converted or projected to another coordinate space corresponding to a different frame, the sensor data 110 may include ego-motion information—e.g., rotation, position, and/or velocity data captured by an IMU, GPS, and/or visual odometry system of the vehicle 500. Using the ego-motion information included in the sensor data 110, the channel generator 120 may convert or project depth values to another coordinate space. As such, once in a same coordinate system, where depth values differ for a particular pixel (e.g., by more than a threshold depth difference), the image comparer 124 may determine that the point or pixel corresponds to a moving or dynamic object. In some embodiments, the depth values and location (e.g., order) of 3D points of the current range image may be preserved by the channel generator 120 for use in subsequent computations where the current range image may be used as a previous range image with a corresponding coordinate system. In addition to or alternatively from a projected or a comparison image(s), the prior range image and/or the current range image may be provided as the channel(s) 130 directly to the motion model 140 without projecting to a different coordinate space.

In some embodiments, a number of channel(s) 130 output by the channel generator 120 may depend on the number of previous frames corresponding to previous time stamps that are to be provided to the motion model 140. As a non-limiting example, for each previous frame, three input channels may include a current frame projected to the prior frame, the previous frame projected to the current frame, and a comparison image, from the image comparer 124, comparing current frame values projected to the prior frame to prior frame values. Although described as including three channels for each frame, this is not intended to be limiting, and in some embodiments one or more of the channels may be used for each prior frame.

In some embodiments, the channel(s) 130 may be provided as one or more input images (e.g., a channel stack) to the motion model 140. The motion model 140 may process the channel stack to generate the motion mask(s) 150 with motion confidence values (e.g., from 0 to 1) assigned to one or more (e.g., each) of the pixels indicating a confidence that the pixel is associated with a static or dynamic object or feature. In some embodiments, using the motion mask(s) 150 output from the motion model 140, the system 100 may identify point clusters in the motion mask(s) 150 corresponding to objects and track those objects across frames. In further embodiments, the motion mask(s) 150 may be used to identify regions of interest and may be provided as inputs to a separate object detector, which may increase the detection rate of the separate object detector. Moreover, by tracking pixel motion between frames, the system may further determine vectors corresponding to 3D points in addition to motion confidence values. In some embodiments, the motion model 140 may be trained to compute an output of motion vectors in addition to or alternatively from confidence values. For example, for a given pixel in a current frame, the output may include a motion vector pointing to the same pixel (e.g., a pixel corresponding to the same feature or object) in a prior frame.

Figure 2:
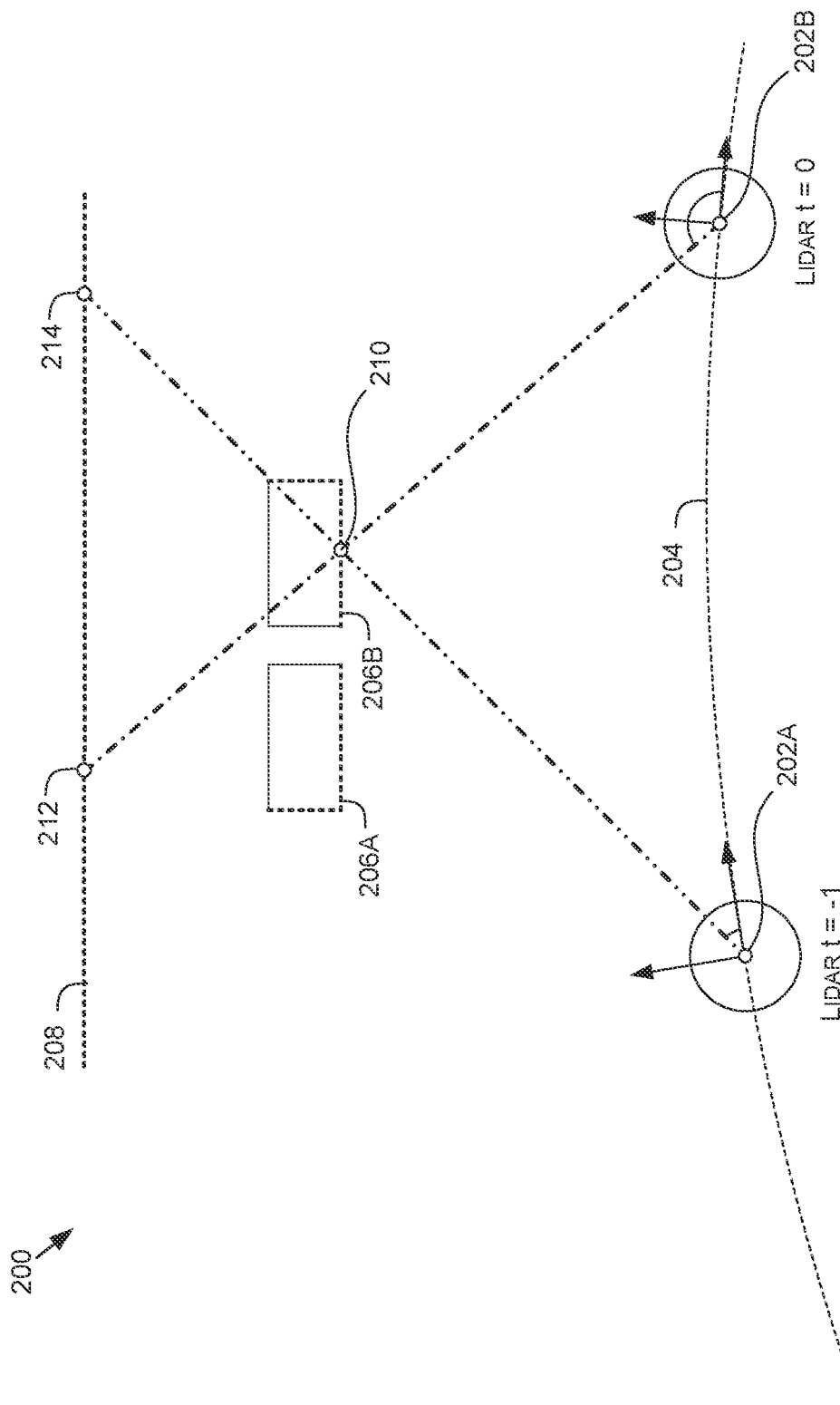
FIG. 2 depicts an example driving environment, in accordance with some embodiments of the present disclosure.

Now referring to FIG. 2, FIG. 2 is an example environment 200, in accordance with some embodiments of the present disclosure. The environment 200 includes a location 202A for the ego-machine at $T_{-1}$, a location 202B for the ego-machine at $T_0$, ego-trajectory 204, vehicle location 206A, vehicle location 206B, wall 208, and 3D points 210, 212, and 214. The environment 200 illustrates an ego-machine traveling along the ego-trajectory 204 from the location 202A at $T_{-1}$ to the location 202B at $T_0$. Additionally, FIG. 2 illustrates the effect of measuring object distance for a pixel when a vehicle moves from the vehicle location 206A to the vehicle location 206B as the ego-machine moves from the location 202A at $T_{-1}$ to the location 202B at $T_0$.

With respect to the 3D point 210 in environment 200, generated channels may represent, for 3D point 210, a first channel associated with a distance between location 202B for the ego-machine at $T_0$ and the 3D point 210. This first channel may correspond to directly applying the range image corresponding to a current time as an input channel. A second channel may be associated with a distance between the location 202B for the ego-machine at $T_0$ and 3D point 212 at $T_{-1}$ that projects to the same pixel as the 3D point 210 when viewed from the location 202B for the ego-machine at $T_0$. A third channel may be associated with a distance between the location 202A for the ego-machine at $T_{-1}$ and 3D point 210. A fourth channel may be associated with a distance between the location 202A for the ego-machine at $T_{-1}$ and the 3D point 214 at $T_{-1}$ that projects to the same pixel as 3D point 210 when viewed from the location 202A for the ego-machine at $T_{-1}$.

As such, if the system determines that a depth value corresponding to a 3D point, such as 3D point 210, has changed over time, the system may infer that movement has occurred at that particular 3D point. As a non-limiting example, if a first measured distance for a pixel from the location 202A for the ego-machine at $T_{-1}$ to an object (e.g., the 3D point 214 on the wall 208) is 10 meters in a previous range image at time $T_{-1}$, and a second measured distance for the pixel from the location 202B for the ego-machine at $T_0$ to an object (e.g., the 3D point 210) is 5 meters in a current range image at time $T_0$, then the system may determine that a vehicle has moved from vehicle location 206A to vehicle location 206B and now obstructs the line-of-sight of the sensor(s) of the ego-machine at location 202B for the ego-machine at $T_0$. In other words, at $T_0$, the ego-machine is unable to measure the distance to the 3D point 212 from the location 202B because the vehicle has moved from vehicle location 206A to 206B. Instead, the distance measured for the pixel is the distance from the location 202B to the 3D point 210 and, based on this distance difference, the system may determine movement associated with the pixel.

Figure 3:
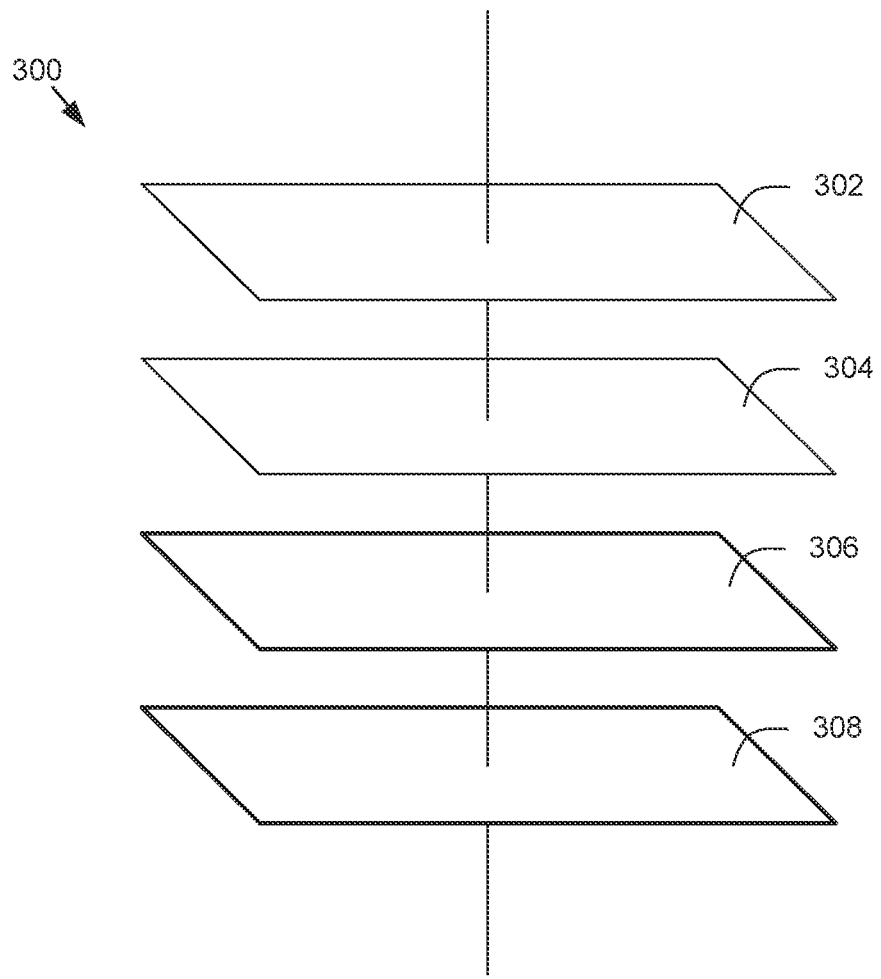
FIG. 3 depicts an example input image, in accordance with some embodiments of the present disclosure.

Now referring to FIG. 3, FIG. 3 is an example input image 300, in accordance with some embodiments of the present disclosure. The input image 300 includes channels 302, 304, 306, and 308. While FIG. 3 shows 4 channels, the number of channels provided in the input image 300 to a machine learning model (e.g., motion model 140) may be calculated according to equation (1) described above. In some examples, each prior frame may include three input channels, and the three input channels may include a current frame projected to the prior frame, the prior frame projected to the current frame, and a comparison image comparing current frame values projected to the prior frame to prior frame values. Although described as including all three channels for each prior frame, this is not intended to be limiting, and in some embodiments one or more of the channels may be used for each prior frame.

Using, as an example, the environment 200, the locations 202A/B, and the 3D points 210, 212, and 214 of FIG. 2, each of the channels 302, 304, 306, and 308 may include distance information. For example, channel 302 may include a distance between the location 202B for the ego-machine at $T_0$ and the 3D point 210, channel 304 may include a distance between the location 202B for the ego-machine at $T_0$ and 3D point 212, channel 306 may include a distance between the location 202A for the ego-machine at $T_{-1}$ and 3D point 210, and channel 308 may include a distance between the location 202A for the ego-machine at $T_{-1}$ and the 3D point 214. The input image 300 with each of these channels and corresponding distance information may be provided to the machine learning model to determine static and dynamic objects in an environment, such as in environment 200 of FIG. 2.

Where the machine learning model is a DNN, such as a convolution neural network (CNN), the DNN may include a lightweight architecture, such as a fully convolutional architecture consisting of only convolutional layers. In some embodiments, there may be ten or less (e.g., six) layers in total for the DNN. The limited number of layers and the overall lightweight architecture may be possible due to the amount of information and detail available in the input image 300.

Although examples are described herein with respect to using DNNs, and specifically convolutional neural networks (CNNs), this is not intended to be limiting. For example, and without limitation, the DNN(s) 126 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models.

In some embodiments, where a DNN is used, the DNN may include any number of layers. One or more layers may include convolutional layers. The convolutional layers may compute the output of neurons that are connected to local regions in an input layer, each neuron computing a dot product between their weights and a small region they are connected to in the input volume. One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer. One or more of the layers may include a pooling layer. The pooling layer may perform a down sampling operation along the spatial dimensions (e.g., the height and the width), which may result in a smaller volume than the input of the pooling layer. One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the DNN, and some or all of the convolutional streams may include a respective fully connected layer(s). In some non-limiting embodiments, the DNN may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN, this is not intended to be limiting. For example, additional or alternative layers may be used in the DNN, such as normalization layers, SoftMax layers, and/or other layer types. In embodiments where the DNN includes a CNN, different orders and numbers of the layers of the CNN may be used depending on the embodiment. In other words, the order and number of layers of the DNN is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 4:
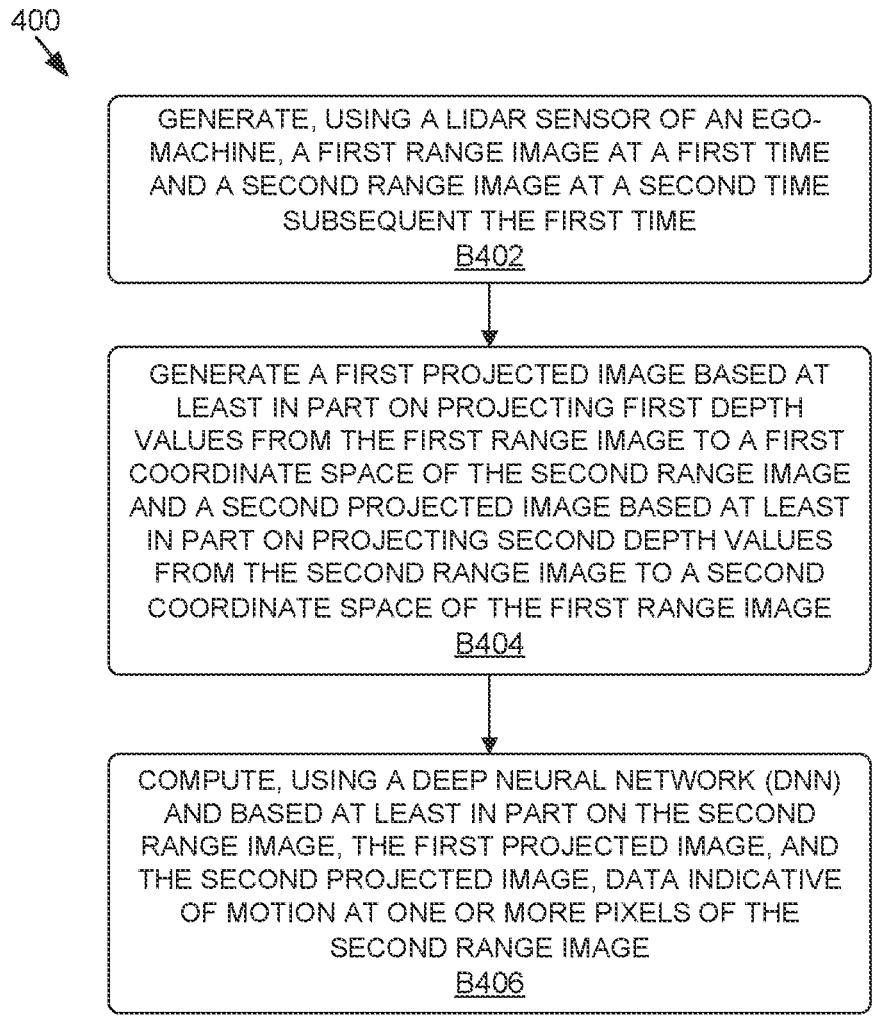
FIG. 4 is a flow diagram showing a method for computing data indicative of motion at one or more pixels of a range image, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the system for detecting static and dynamic features of FIG. 1. However, these methods may additionally or alternatively be executed by any one system, or any combination of systems, including, but not limited to, those described herein.

FIG. 4 is a flow diagram showing a method 400 for computing data indicative of motion at one or more pixels of a range image, in accordance with some embodiments of the present disclosure. The method 400, at block B402, includes generating, using a LiDAR sensor of an ego-machine, a first range image at a first time and a second range image at a second time subsequent the first time. For example, where LiDAR sensors are used, raw LiDAR data may be generated at each frame or time step, and the raw LiDAR data may be used to generate a point cloud in 3D world-space representing depth, elevation, and lateral locations of points corresponding to features and/or objects in the environment. Using the point cloud, for example, one or more 2D image representations may be generated—such as a LiDAR range image, a top-down or birds eye view image, etc.—that represent the elevation and lateral location of points at (x, y) pixel locations, with depth values (and/or other values, such as intensity, reflectivity, etc.) encoded to the pixels.

The method 400, at block B404, includes generating a first projected image based at least in part on projecting first depth values from the first range image to a first coordinate space of the second range image and a second projected image based at least in part on projecting second depth values from the second range image to a second coordinate space of the first range image. For example, one or more depth values corresponding to a current range image may be converted or projected to a coordinate system of a prior range image to generate a projected image. For example, a transformation may be applied to the 3D points corresponding to the depth values in the current range image to locate these 3D points within the pixel index of the previous range image(s) using a coordinate system of the previous range image(s).

The method 400, at block B406, includes computing, using a deep neural network (DNN) and based at least in part on the second range image, the first projected image, and the second projected image, data indicative of motion at one or more pixels of the second range image. For example, channels may be provided as one or more input images (e.g., a channel stack) to the motion model 140 (e.g., a machine learning model), and the motion model 140 may process the channel stack to generate a motion mask with motion confidence values (e.g., from 0 to 1) assigned to one or more (e.g., each) of the pixels indicating a confidence that the pixel is associated with a static or dynamic object or feature—e.g., a pixel with a value of 0.3 may be less likely to have motion associated therewith than a pixel with a value of 0.9.

Example Autonomous Vehicle

Figure 5A:
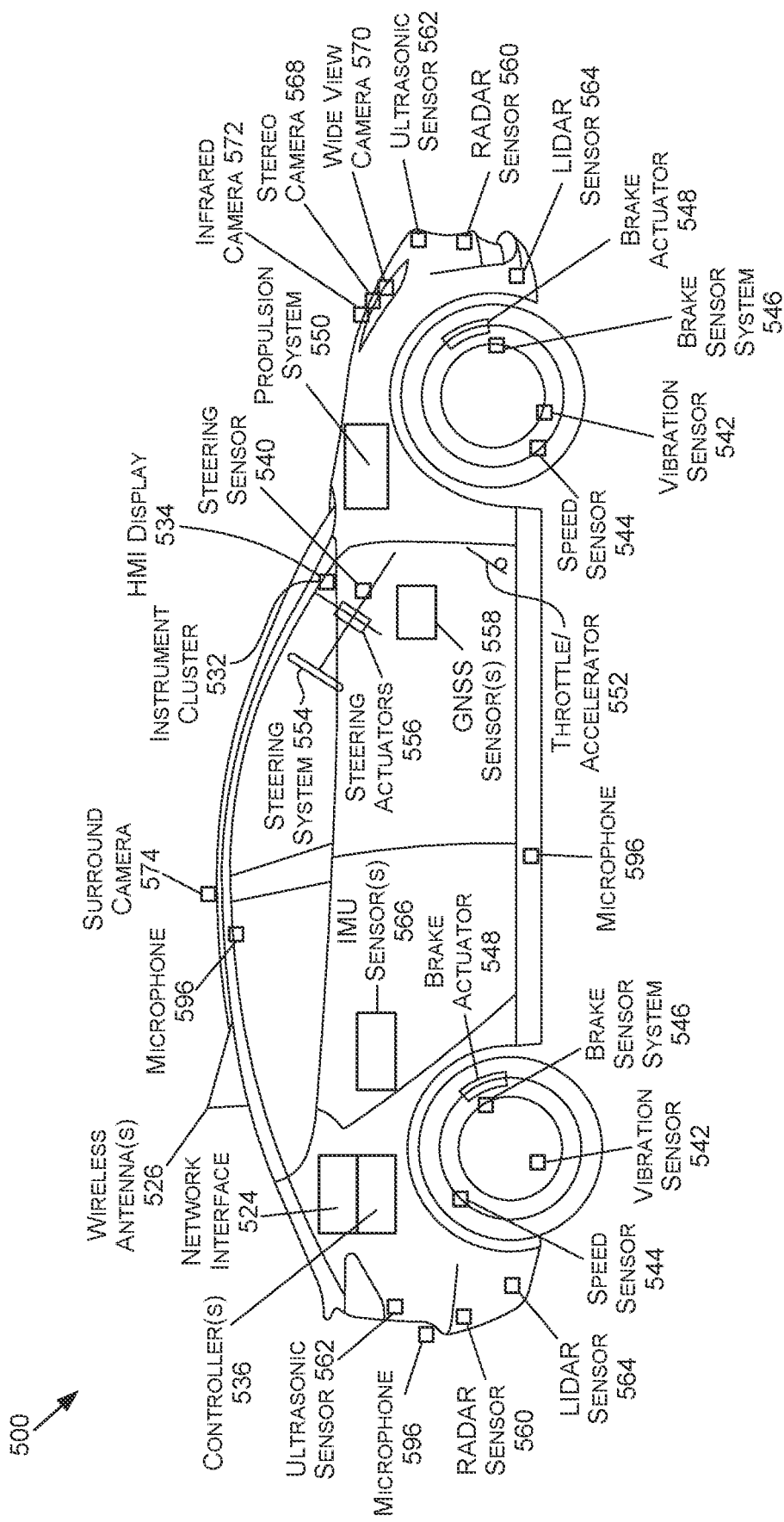
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3—Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
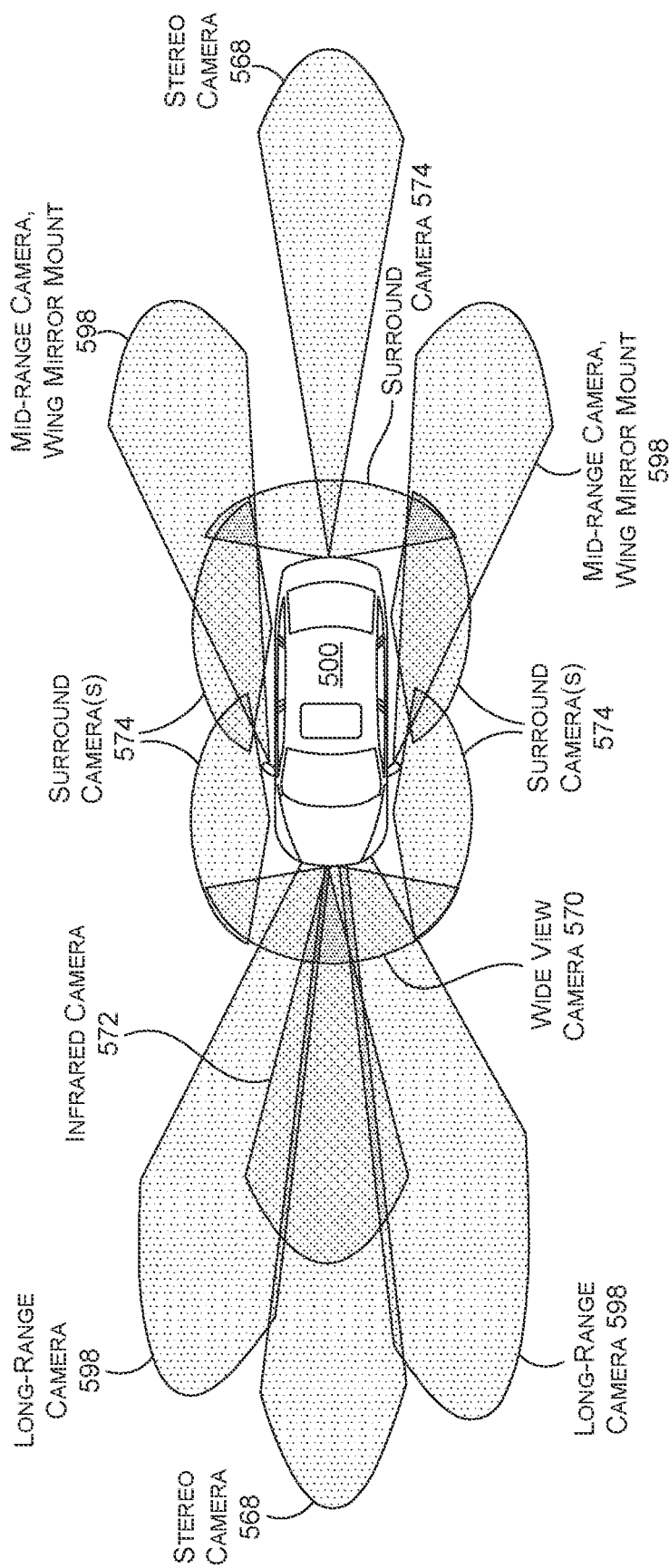
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
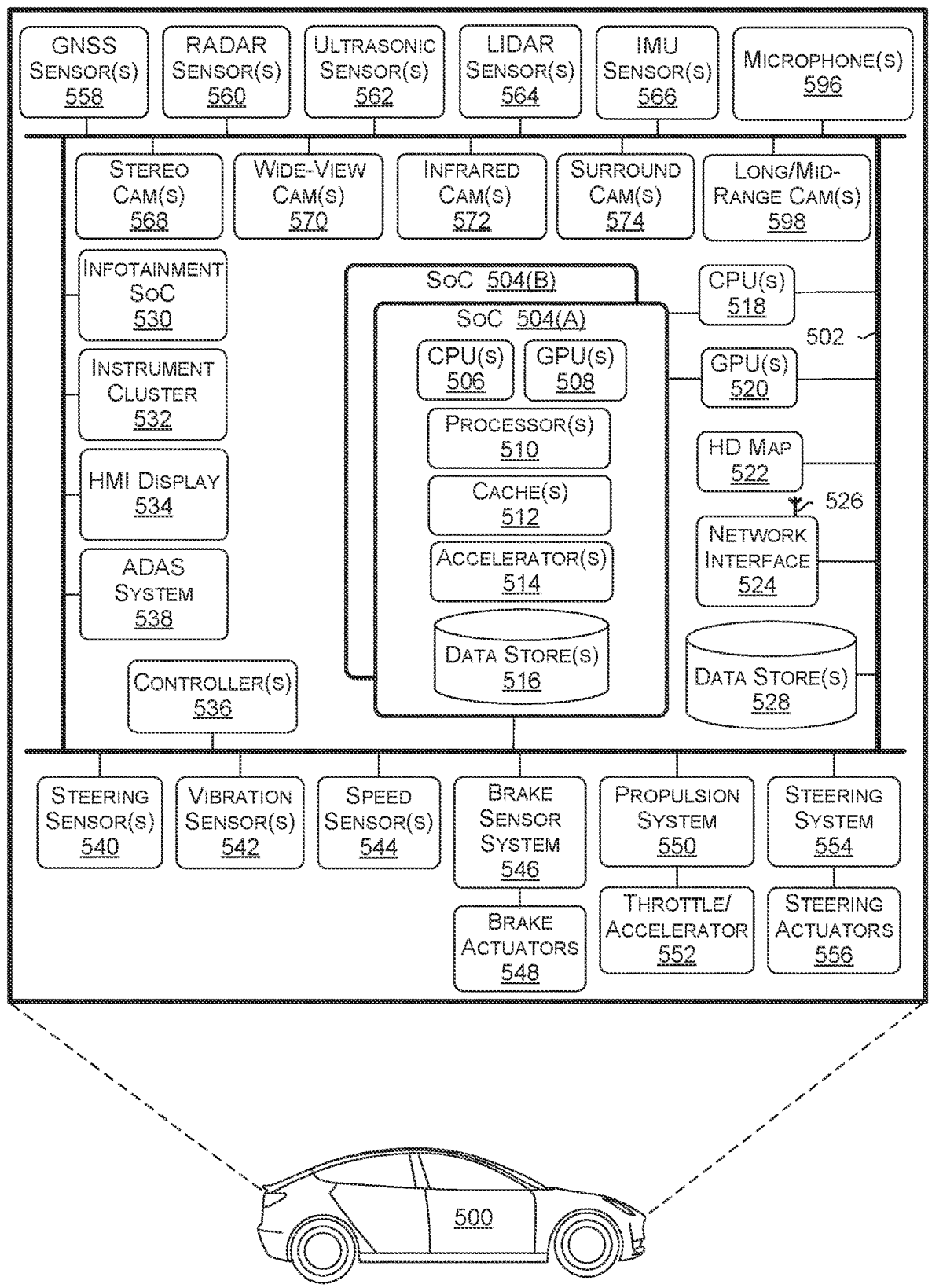
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
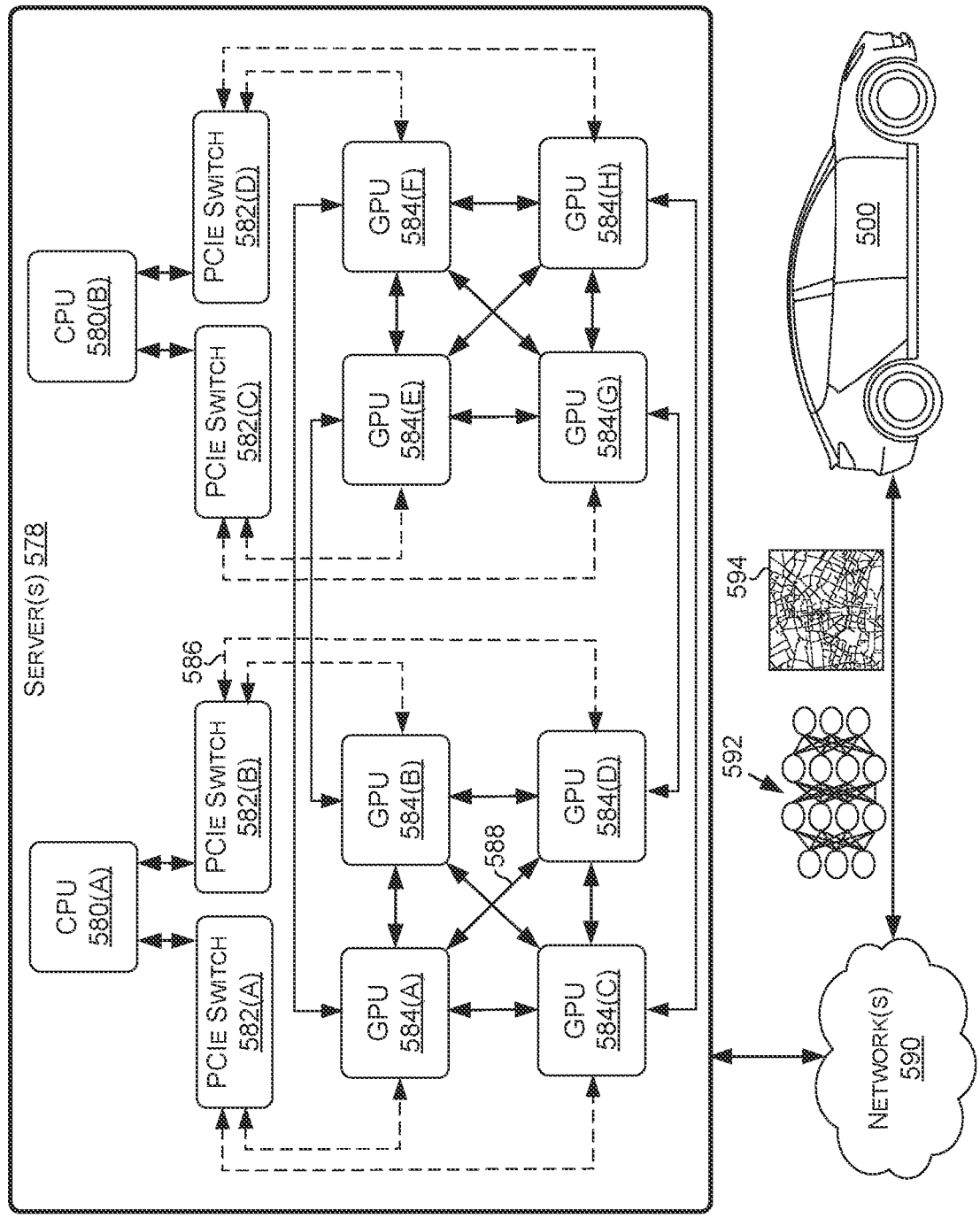
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
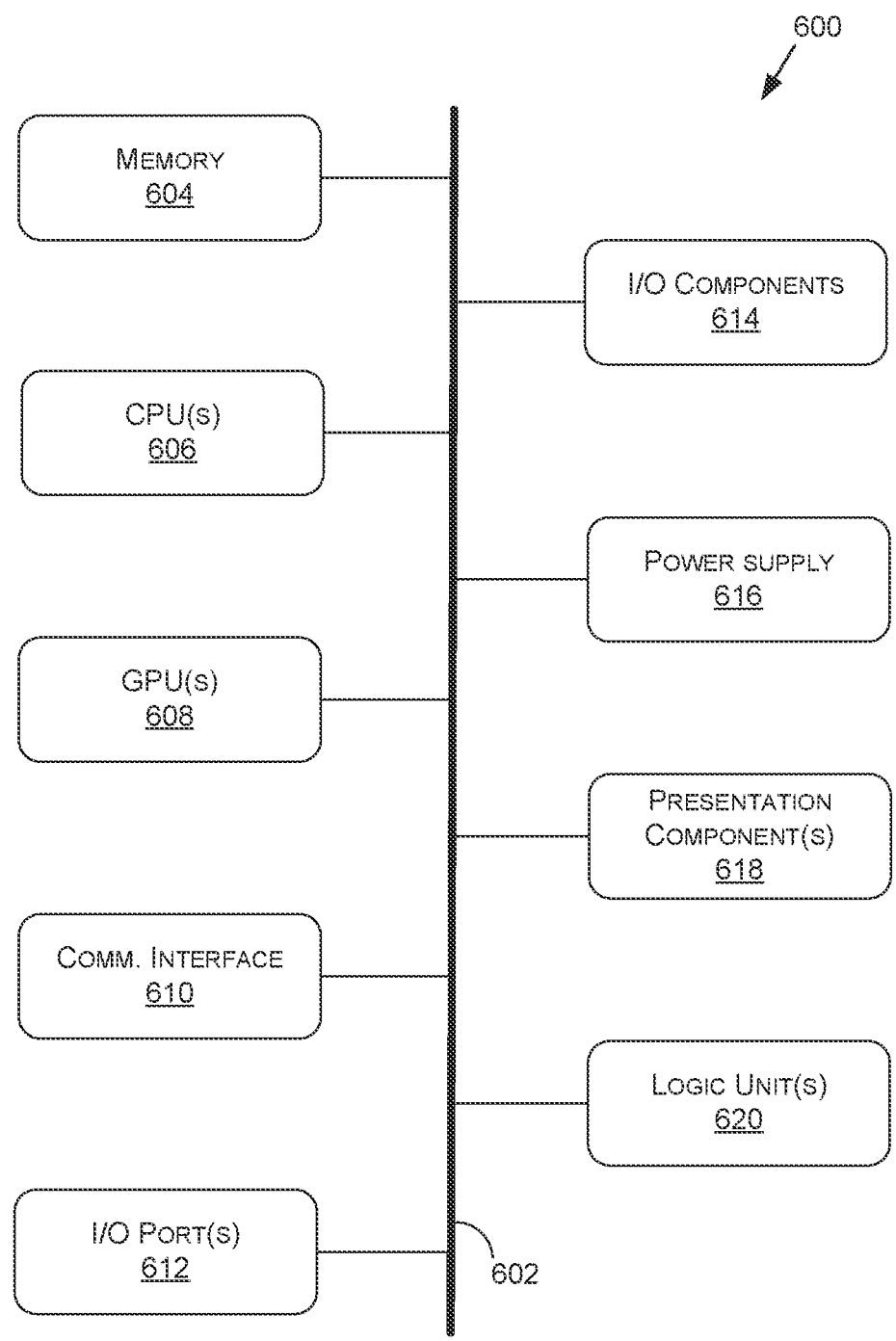
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
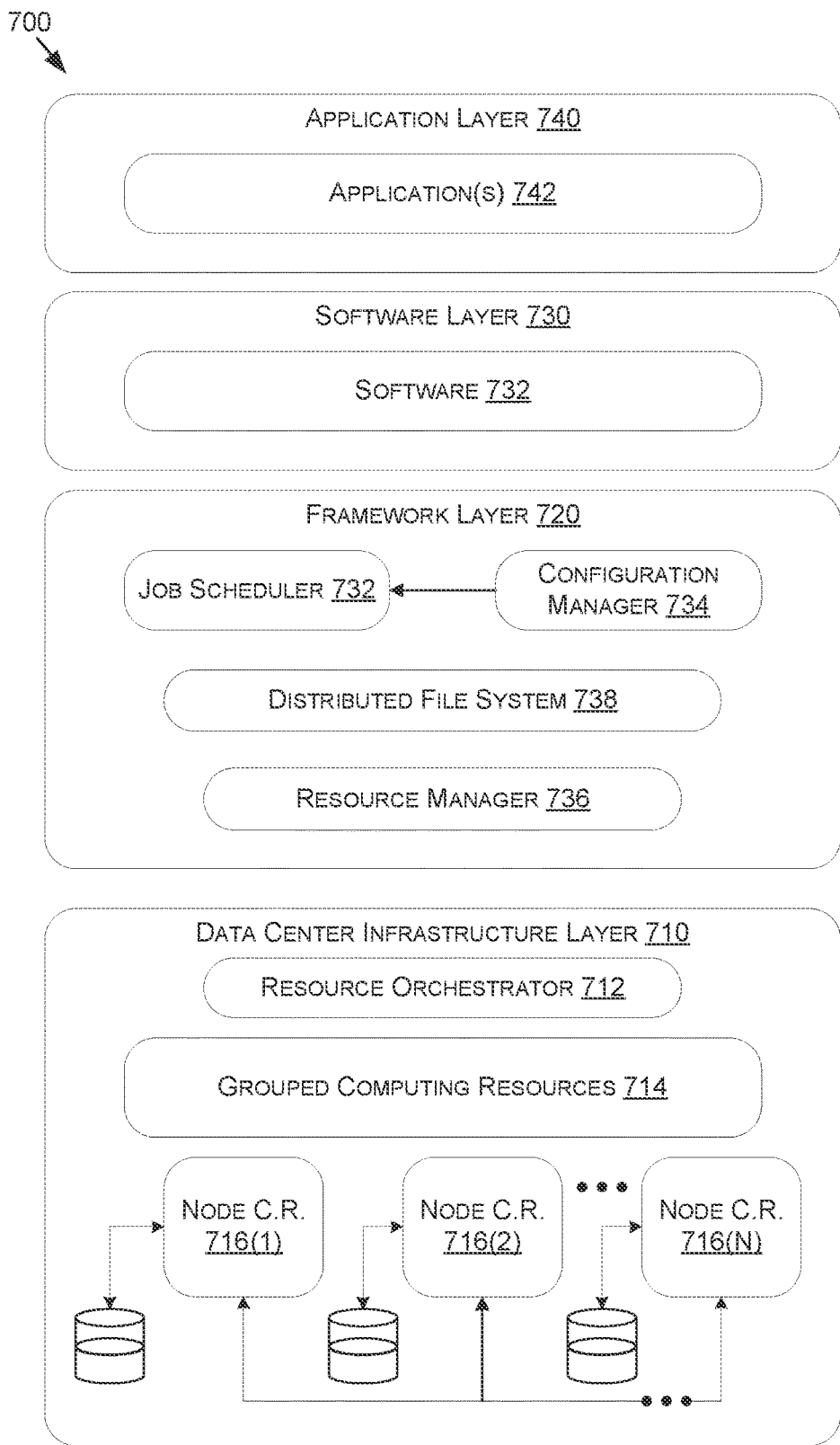
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-

716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits to:
generate, using sensor data obtained using one or more sensors of an ego-machine, a first range image corresponding to a first time and a second range image corresponding to a second time subsequent to the first time;
generate a first projected image based at least on projecting first depth values from the first range image to a first coordinate space of the second range image and a second projected image based at least on projecting second depth values from the second range image to a second coordinate space of the first range image;
compute, from the first projected image and the second projected image, input data to a deep neural network (DNN), the input data indicating differences in depth between the first range image and the second range image and differences in spatial correspondences of scene points across the first coordinate space and the second coordinate space; and
compute, based at least on the DNN processing the input data, output data indicative of motion at one or more pixels of the second range image.

2. The at least one processor of claim 1, further comprising one or more circuits to:
generate a comparison image based at least on part on comparing the second depth values from the second range image in the second coordinate space of the first range image to depth values of the first range image; and
wherein the input data is computed from the comparison image.

3. The at least one processor of claim 1, the input data includes a first representation of one or more regions of the first projected image and a second representation of one or more regions of the second projected image.

4. The at least one processor of claim 1, wherein the first projected image and the second projected image are generated using tracked ego-motion of the ego-machine between the first time and the second time.

5. The at least one processor of claim 1, wherein the input data includes a first channel corresponding to a first distance between a first location for the ego-machine at the first time and a first (three-dimensional) 3D point that projects to a same pixel as a second 3D point when viewed from a second location for the ego-machine at the second time, and a second channel corresponding to a second distance between the second location and the second 3D point.

6. The at least one processor of claim 1, wherein the output data computed using the DNN is representative of a motion mask, the motion mask having one or more first values being indicative of one or more first objects depicted using the second range image being in motion at the second time and having one or more second values being indicative of one or more second objects depicted using the second range image being static at the second time.

7. The at least one processor of claim 6, wherein the motion mask comprises, for each of the one or more pixels of the second range image, a confidence value between 0 and 1, the confidence value being indicative of whether a feature or object represented using a respective pixel of the one or more pixels corresponds to an object in motion at the second time.

8. The at least one processor of claim 1, wherein the one or more circuits are further to perform, using the output data indicative of motion, one or more control operations corresponding to the ego-machine based at least on the motion at the one or more pixels of the second range image.

9. The at least one processor of claim 1, wherein the DNN is trained to predict a likelihood that one or more pixels correspond to a static or a dynamic object.

10. The at least one processor of claim 1, wherein the at least one processor is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

11. A method comprising:
generating, using a sensor of an ego-machine, a first range image at a first time and a second range image at a second time subsequent the first time;

generating a first projected image based at least on projecting one or more first depth values from the first range image to a first coordinate space of the second range image;

generating a second projected image based at least on projecting one or more second depth values from the second range image to a second coordinate space of the first range image;

computing, from the first projected image and the second projected image, input data to a deep neural network (DNN), the input data indicating differences in depth between the first range image and the second range image and differences in spatial correspondences of scene points across the first coordinate space and the second coordinate space; and computing, based at least on a deep neural network (DNN) the DNN processing the input data, output data indicative of motion at one or more pixels of the second range image.

12. The method of claim 11, further comprising:

generating a comparison image based at least in part on comparing the second depth values from the second range image in the second coordinate space of the first range image to depth values of the first range image, wherein the input data is computed from the comparison image.

13. The method of claim 11, wherein the input data includes a first representation of one or more regions of the first projected image and a second representation of one or more regions of the second projected image.

14. The method of claim 11, wherein the generating the first projected image and the second projected image are based at least on tracked ego-motion of the ego-machine between the first time and the second time.

15. A system comprising:

one or more processors to perform operations including:

generating, using a sensor of an ego-machine, a first range image at a first time and a second range image at a second time subsequent the first time;

generating a first projected image based at least on projecting one or more first depth values from the first range image to a first coordinate space of the second range image;

generating a second projected image based at least on projecting one or more second depth values from the second range image to a second coordinate space of the first range image;

computing, from the first projected image and the second projected image, input data to a deep neural network (DNN), the input data indicating differences in depth between the first range image and the second range image and differences in spatial correspondences of scene points across the first coordinate space and the second coordinate space; and computing, using the DNN having the input data, output data indicative of motion at one or more pixels of the second range image.

16. The system of claim 15, wherein the operations further include:

generating a comparison image based at least on part on comparing the second depth values from the second range image in the second coordinate space of the first range image to depth values of the first range image, wherein the computing the input data is computed from the comparison image.

17. The system of claim 15, wherein, for each range image of n number of range images prior to the second range image, a respective first projected image, second projected image, and comparison image are generated using the second range image.

18. The system of claim 15, wherein the generating the first projected image and the second projected image are based at least on tracked ego-motion of the ego-machine between the first time and the second time.

19. The system of claim 15, wherein the operations further include computing, based at least on the output data computed using the DNN, one or more object detections.

20. The system of claim 15, wherein the system is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

* * * * *